United States Patent [19]
Lebkuchner

[11] Patent Number: 6,079,625
[45] Date of Patent: Jun. 27, 2000

[54] THERMOSTATIC MIXING VALVE

[75] Inventor: Benno Lebkuchner, Warwick, R.I.

[73] Assignee: Honeywell International, Inc., Warwick, R.I.

[21] Appl. No.: 09/362,411

[22] Filed: Jul. 28, 1999

Related U.S. Application Data

[60] Provisional application No. 60/099,090, Sep. 4, 1998, and provisional application No. 60/099,444, Sep. 8, 1998.

[51] Int. Cl.$^7$ .................................................. G05D 23/13
[52] U.S. Cl. .......................................................... 236/12.2
[58] Field of Search ........................... 236/12.2, 12.21, 236/12.22, 12.18

[56] References Cited

U.S. PATENT DOCUMENTS

| | | | |
|---|---|---|---|
| Re. 19,488 | 3/1935 | Russell et al. | 236/12.2 |
| 3,765,604 | 10/1973 | Trubert et al. | 236/100 |
| 3,792,812 | 2/1974 | Knapp | 236/12.2 |
| 3,929,283 | 12/1975 | Delpla | 236/12.2 |
| 4,607,788 | 8/1986 | Bendall et al. | 236/12.2 |
| 5,129,576 | 7/1992 | Pullen et al. | 236/12.2 |
| 5,148,976 | 9/1992 | Reid | 236/12.2 |
| 5,203,496 | 4/1993 | Kline | 236/12.2 |
| 5,323,960 | 6/1994 | Kline | 236/12.2 |
| 5,340,018 | 8/1994 | MacDonald | 236/12.2 |

*Primary Examiner*—William Tapolcai
*Attorney, Agent, or Firm*—Salter & Michaelson

[57] ABSTRACT

A mixing valve receives fluid from a first source and fluid from a second source and outputs a mixture of the fluids. The mixing valve includes a valve body including a first fluid inlet, a first fluid chamber, a second fluid inlet, a second fluid chamber, and a fluid outlet. The mixing valve further comprises a fluid flow regulator mounted within the housing, wherein a lower surface of the fluid flow regulator is disposed within the first fluid chamber and an upper surface of the fluid flow regulator is disposed within the second fluid chamber. The fluid flow regulator is mounted within the valve body in such a way as to permit movement of the fluid flow regulator along a longitudinal axis of the valve body. The fluid flow regulator includes a central hub which extends below the lower surface into the mixing chambr. A temperature-sensing device is mounted to the central hub of the fluid flow regulator and is constructed and arranged for sensing a temperature of fluid which flows from the mixing chamber to the outlet.

10 Claims, 4 Drawing Sheets

THERMOSTATIC MIXING VALVE

CROSS-REFERENCE TO RELATED APPLICATIONS

This application claims the benefit of U.S. Provisional Patent Application Ser. Nos. 60/099,090 and 60/099,444, filed Sep. 4, 1998 and Sep. 8, 1998, respectively.

BACKGROUND OF THE INVENTION

1. Field of the Invention

The present invention generally relates to mixing valves, and more particularly to a thermostatic mixing valve having an improved mixing chamber and a diffuser for facilitating the mixing of a hot fluid and a cold fluid.

2. Discussion of the Related Art

Thermostatic mixing valves are commonly used in plumbing systems. They typically take hot water from a water heater and cold water as supplied to the building by the water company and blend the hot and cold water to a desired intermediate temperature. The blended (or mixed) water is then fed into the hot water supply piping of the building. For a number of reasons it is generally desirable to have the hot water generator produce water hotter than that desired at the plumbing fixture, thus the need for a mixing valve. The valves are so constructed that the temperature of the mixed water remains constant, or nearly constant, regardless of the actual hot and cold water temperatures and regardless of the flow rate.

The prior art valves work fairly well under steady state conditions, i.e., steady pressures and temperatures at all points and parts along the plumbing system. However, when steady state conditions are suddenly disturbed, such as, for example, when a nearby flushometer is being activated, large fluctuations in the mix water temperature can occur. Changes as much as ±15° F. have been observed.

A prior art thermostatic valve is shown in FIG. 1. The valve 10 consists of six major components: a body 12, a thermal actuator 14, a spool 16, a biasing spring 18, a body cover 20 and a temperature selection device 22.

The body 12 incorporates a hot port, made up of an external hot port 24a and an internal hot port 24b, a cold port, made up of an external cold port 26a and an internal cold port 26b, and a mix port 28. Body 12 also includes a hot annular groove 56 and a cold annular groove 58. The body 12 and is typically formed from forged or cast metal. The thermal actuator 14 is a device which monitors the temperature of water flowing past it and converts temperature changes into an axial motion via a piston 30. Thermal actuators are made by a number of manufactures, including Vernet. The operating principle of thermal actuators, also called thermal elements, is known in the art and will not be described in detail. Generally, a thermal expansion material (not shown) which is located within cup 32 of thermal actuator 14 expands and contracts in response to increases and decreases, respectively, in the temperature of the fluid which flows past the cup 32. When the thermal expansion material expands, it pushes actuator piston 30 of thermal actuator 14 outwardly. When the thermal expansion material contracts, actuator piston 30 recedes into the thermal actuator 14. A mixing chamber 60 is formed between the bottom of spool 16 and an annular ring 62, which is part of cup 32 of thermal actuator 14.

The spool 16 is located between surface A of the body 12 and surface B of the body cover 20. The distance between surface A of the body 12 and surface B of the body cover 20 is greater than the length l of spool 16. The difference in the distance between surface A of body 12 and surface B of body cover 20 and the spool length l is referred to as the spool stroke, which is the distance that the spool 16 can travel between the surface A of body 12 and surface B of body cover 20. Spool 16 includes an annular cold water chamber 34 and is supported and frictionally engaged within body 12 by O-ring seal 36.

Thermal actuator 14 is threadably coupled to spool 16 within a central hub 44 of spool 16, such that actuator piston 30 is disposed within central hub 44 and such that the actuator piston 30 travels in a direction along the longitudinal axis 46 of the spool 16.

Temperature selection device 22 includes a spindle 40 which is threadably coupled to a handwheel 42. Spindle 40 includes a head 52 disposed within central hub 44 of spool 16 such that it is in direct contact with actuator piston 30. Spindle 40 is frictionally mounted within central hub 44 by an O-ring seal 54. Bias spring 18 is engaged at one end against an internal ridge 50 of body 12 and at the opposite end against annular ring 62 of thermal actuator 14, and biases actuator piston 30 of thermal actuator 14 against head 52 and spool 16 toward surface B of body cover 20. Temperature selection device 22 is operable by turning handwheel 42 in a counterclockwise direction to urge spindle 40 against actuator piston 30, thereby forcing spool 16 away from surface B of body cover 20 and toward surface A of body 12. Conversely, handwheel 42 is turned in a clockwise direction to draw spindle 40 away from actuator piston 30, thereby allowing the bias force provided by bias spring 18 to push spool 16 toward surface B of body cover 20 and away from surface A of body 12. As further described below, this adjustment of the distance between spool 16 and surfaces A and B changes the ratio between the hot and cold water which is being mixed by the valve 10. A typical range is 80° F.–120° F. but almost any range required can be provided.

The operation of valve 10 will now be described. Hot water enters the body 12 through the external hot port 24a, as shown by dashed lines 80, fills the hot annular distribution groove 56, and then flows radially inward through the internal hot port 24b into the mixing chamber 60. Cold water enters the body 12 through the external cold port 26a, as shown by dotted dashed lines 82, fills the cold annular distribution groove 58, flows radially inward through the internal cold port 26b into the annular cold water chamber 34 and then flows through a series of holes located in the spool 16 into the mixing chamber 60. Hot and cold water blend in the mixing chamber 60 to provide water having a temperature somewhere between the hot water and cold water temperatures. This mixed water, shown by solid lines 84, is discharged from valve 10 through mix port 28.

If the temperature of the cold water supply decreases such that the thermal expansion material within cup 32 of thermal actuator expands, actuator piston 30 is pushed outwardly from thermal actuator 14 against head 52 of spindle 40. This causes thermal actuator 14 to pull spool 16 away from surface B of body cover 20 and toward surface A of body 12. As spool 16 is pulled toward surface A, the width of the internal hot port 24b decreases, thereby decreasing the amount of hot water which is allowed to pass into mixing chamber 60. At the same time, as spool 16 is pulled away from surface B, the width of the internal cold port 26b increases, thereby increasing the amount of cold water which is allowed to pass through annular cold water chamber 34 and into mixing chamber 60. The resulting mix of water discharged through mix port 28 therefore has a temperature which is closer to the desired temperature set by the temperature selection device. As the temperature of the mixed water decreases, the thermal expansion material contracts, causing actuator piston 30 to recede into the thermal actuator. Bias spring 18 then forces thermal actuator 14 and spool 16 toward surface B, thereby allowing internal hot port 24b and internal cold port 26b to return to their steady-state positions.

If the temperature of the hot water supply decreases, the opposite action occurs in thermal actuator 14 and, as piston 30 retracts into the thermal actuator 14, spool 16 is pushed toward surface B by bias spring 18. This causes the width of the internal hot port 24b to increase, thereby increasing the amount of hot water which is allowed to pass into mixing chamber 60. At the same time, as spool 16 is pushed toward surface B, the width of the internal cold port 26b decreases, thereby decreasing the amount of cold water which is allowed to pass through annular cold water chamber 34 and into mixing chamber 60. The resulting mix of water discharged through mix port 28 therefore has a temperature which is closer to the desired temperature set by the temperature selection device.

As described above, the amount of actuator piston extension is a function of the temperature of the element. This fact is exploited to provide the temperature control for the mixing valve 10. The spool 16 will settle in at the exact axial position which delivers the mix water temperature that is consistent with the actuator piston 30 extension of that temperature. Should a disturbance occur, such as for example, an increase in the hot water supply temperature, the mix temperature is momentarily also increased. The thermal actuator 14 reacts to this increase of mix temperature with a corresponding increase in the extension of actuator piston 30. Since thermal actuator 14 and spool 16 are biased against each other, the spool 16 is driven downward, thus decreasing the size of the internal hot port 24b while simultaneously increasing the size of the internal cold port 26b, thus restoring the desired mix temperature. As is readily apparent, when the axial position of the adjustment spindle 40 is changed (when turning hand wheel 42, spindle 40 moves up or down in the spindle thread 70) the resulting mix temperature also changes. The total achievable range is determined by the specific characteristics of the thermal actuator 14.

There are several shortcomings of the mixing valve 10 described above. First, the mixing chamber 60 is too small to allow the hot and cold water to thoroughly mix before passing by the cup 32 of the thermal actuator 14. This can cause wide ranges of temperatures which are flowing across thermal actuator 14, which can result in inaccurate reactions of the thermal actuator 14. This causes the actuator to read and respond to a false mix temperature. When, some distance downstream of the valve, the water does become thoroughly mixed, its temperature may be significantly different from that which the thermal actuator 14 sensed.

Another shortcoming is the positioning of the bias spring 18 of the mixing valve 10. When the mixed water flows from the mixing chamber 60 toward the cup 32, it is forced through the coils of the bias spring 18 on its way to mix port 28, as shown by solid lines 84. Since some of the water is directed away from the cup 32 by the coils of the bias spring 18, a less accurate reading of the water temperature may be taken by the thermal actuator.

Furthermore, the flow of water through the coils of bias spring 18 can cause the spring to vibrate, thereby creating a noise which is objectionable.

What is needed then is a thermostatic mixing valve which facilitates the mixing of the cold and hot water before the water passes over the cup of the thermal actuator, thus allowing the thermal actuator to more accurately react to the temperature of the mixture, thus enabling the thermostatic mixing valve to more accurately maintain the temperature of the water output from the mix port of the mixing valve. Furthermore a mixing valve is needed which includes a biasing spring arrangement that prevents the water from being directed away from the thermal actuator and does not vibrate, thus eliminating objectionable noises from the mixing valve during operation.

SUMMARY OF THE INVENTION

Accordingly, the present invention provides an improved thermostatic mixing valve which facilitates a thorough mixing of the hot and cold water and which does not have the noise problem associated with the prior art. The mixing valve of the present invention includes an extended mixing chamber, which provides more room for the incoming hot and cold water to mix before the mixture flows over the thermal actuator. The mixing valve also includes a diffuser which is biased against the annular ring of the thermal actuator by a bias spring, wherein the diffuser acts to further mix the water flowing from the mixing chamber, while also directing the water toward the cup of the thermal actuator for more accurate sensing of the water temperature by the thermal actuator. The biasing spring is shaped and mounted within the valve in such a way that the water flowing through the valve is directed away from the bias spring by the diffuser, thus reducing or eliminating the noise problem associated with prior art mixing valves.

According to one embodiment of the present invention, a mixing valve is disclosed which receives fluid from a first source and fluid from a second source and outputs a mixture of the fluids. The mixing valve comprises a valve body including a first fluid inlet, a first fluid chamber in fluid communication with the first fluid inlet, a second fluid inlet, a second fluid chamber in fluid communication with the second fluid inlet, a mixing chamber in fluid communication with the first fluid chamber and the second fluid chamber and a fluid outlet in fluid communication with the mixing chamber. The mixing valve further comprises a fluid flow regulator mounted within the housing between the first fluid chamber and the second fluid chamber, wherein a lower surface of the fluid flow regulator is disposed within the first fluid chamber and an upper surface of the fluid flow regulator is disposed within the second fluid chamber. The fluid flow regulator is mounted within the valve body in such a away as to permit movement of the fluid flow regulator along a longitudinal axis of the valve body, the fluid flow regulator having apertures therein which permit a flow of fluid between the second fluid chamber and the mixing chamber. The fluid flow regulator includes a central hub which extends below the lower surface into the mixing chamber. A temperature-sensing device is mounted to the central hub of the fluid flow regulator, the temperature-sensing device including a cup portion disposed proximate the mixing chamber and a piston which extends through the central hub of the fluid flow regulator and into engagement with an adjustably fixed surface of an adjustment device of the mixing valve, the adjustment device being mounted to the valve body of the mixing valve. The cup portion is constructed and arranged for sensing a temperature of fluid which flows from the mixing chamber to the outlet, causing the piston to extend from the temperature-sensing device in response to an increase in temperature and causing the piston to retract into the temperature-sensing device in response to a decrease in temperature. A bias spring is mounted between the valve housing and the temperature-sensing device which biases the temperature-sensing device against the adjustably fixed surface of the adjustment device.

When the temperature of fluid passing from the mixing chamber over the cup increases, the temperature-sensing device moves the fluid flow regulator downward to limit the flow of fluid from the first fluid chamber to the mixing chamber and increase the flow of fluid from the second fluid chamber to the mixing chamber, and when the temperature of fluid passing from the mixing chamber over the cup decreases, the temperature-sensing device moves the fluid flow regulator upward to limit the flow of fluid from the second fluid chamber to the mixing chamber and increase the flow of fluid from the first fluid chamber to the mixing chamber, thereby causing fluid flowing from the fluid outlet to remain close to a preset temperature which is set by the adjustment device.

According to another embodiment of the invention, a mixing valve is disclosed which receives fluid from a first source and fluid from a second source and outputs a mixture of the fluids. The mixing valve comprises a valve body including a first fluid inlet, a first fluid chamber in fluid communication with the first fluid inlet, a second fluid inlet, a second fluid chamber in fluid communication with the second fluid inlet, a mixing chamber in fluid communication with the first fluid chamber and the second fluid chamber and a fluid outlet in fluid communication with the mixing chamber. The mixing valve further comprises a fluid flow regulator mounted within the housing between the first fluid chamber and the second fluid chamber, wherein a lower surface of the fluid flow regulator is disposed within the first fluid chamber and an upper surface of the fluid flow regulator is disposed within the second fluid chamber. The fluid flow regulator is mounted within the valve body in such a away as to permit movement of the fluid flow regulator along a longitudinal axis of the valve body, the fluid flow regulator having apertures therein which permit a flow of fluid between the second fluid chamber and the mixing chamber. A temperature-sensing device is mounted to a central hub of the fluid flow regulator, the temperature-sensing device including a cup portion disposed proximate the mixing chamber and a piston which extends through the central hub of the fluid flow regulator and into engagement with an adjustably fixed surface of an adjustment device of the mixing valve, the adjustment device being mounted to the valve body of the mixing valve. The cup portion is constructed and arranged for sensing a temperature of fluid which flows from the mixing chamber to the outlet, causing the piston to extend from the temperature-sensing device in response to an increase in temperature and causing the piston to retract into the temperature-sensing device in response to a decrease in temperature. A bias spring is mounted between the valve housing and the temperature-sensing device which biases the temperature-sensing device against the adjustably fixed surface of the adjustment device. A diffuser is mounted between the bias spring and an annular ring of the temperature-sensing device, the diffuser being for agitating the fluid as it passes from the mixing chamber into contact with the cup of the temperature-sensing device.

When the temperature of fluid passing from the mixing chamber over the cup increases, the temperature-sensing device moves the fluid flow regulator downward to limit the flow of fluid from the first fluid chamber to the mixing chamber and increase the flow of fluid from the second fluid chamber to the mixing chamber, and when the temperature of fluid passing from the mixing chamber over the cup decreases, the temperature-sensing device moves the fluid flow regulator upward to limit the flow of fluid from the second fluid chamber to the mixing chamber and increase the flow of fluid from the first fluid chamber to the mixing chamber, thereby causing fluid flowing from the fluid outlet to remain close to a preset temperature which is set by the adjustment device.

BRIEF DESCRIPTION OF THE DRAWINGS

In the drawings which illustrate the best mode presently contemplated for carrying out the present invention.

DESCRIPTION OF THE INVENTION

Figure 2:
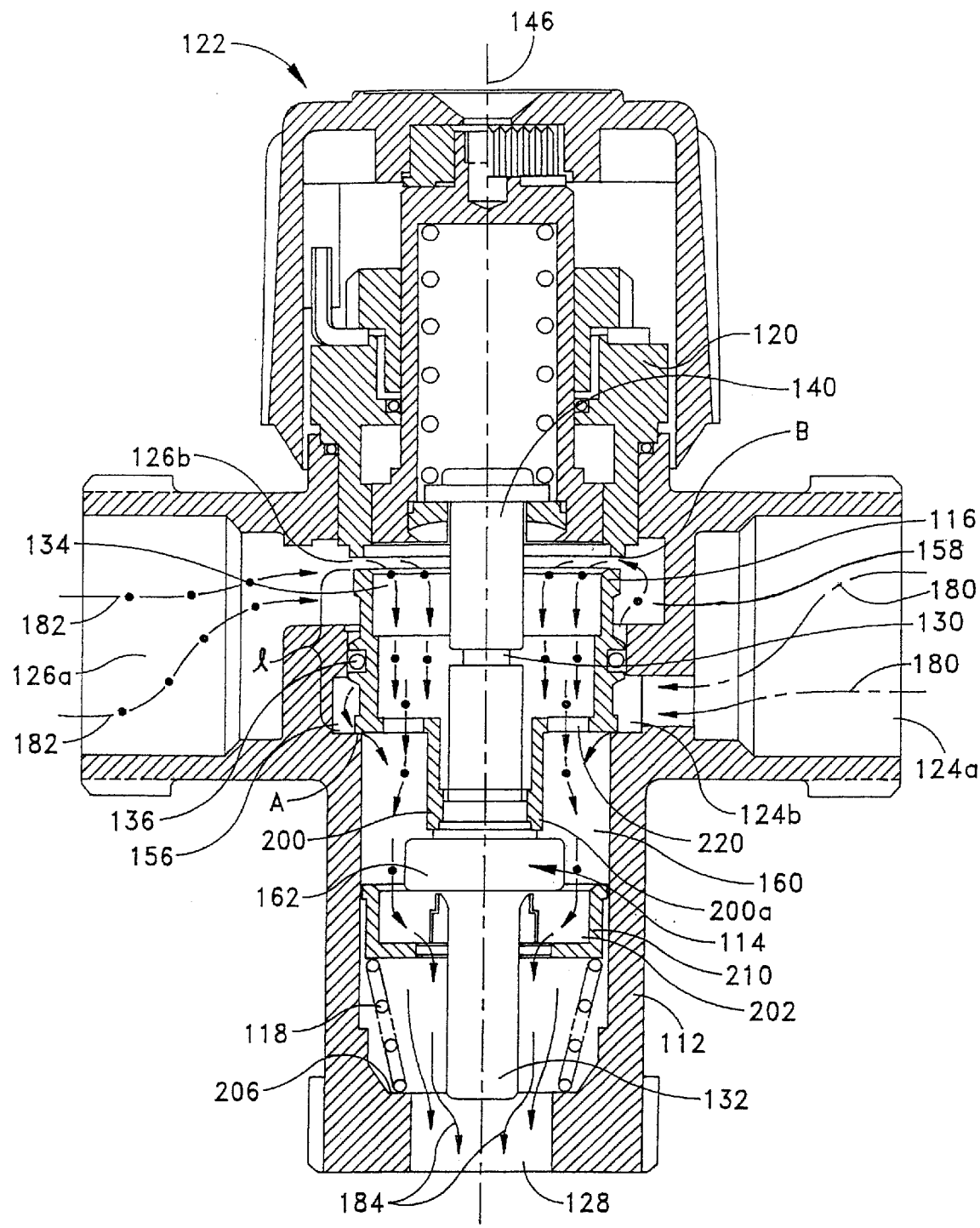
FIG. 2 is a sectional view of the mixing valve of the present invention.

Referring now to FIGS. 2–6, an improved thermostatic mixing valve of the present invention will be described. As shown in FIG. 2, a mixing valve 100 includes a body 112, a thermal actuator 114, a spool 116, a biasing spring 118, a body cover 120 and a temperature selection device 122. The body 112 incorporates a hot port, made up of an external hot port 124a and an internal hot port 124b, a cold port, made up of an external cold port 126a and an internal cold port 126b, and a mix port 128. Body 112 also includes a hot annular groove 156 and a cold annular groove 158. The body 112 is typically formed from forged or cast metal.

The spool 116 is located between surface A of the body 112 and surface B of the body cover 120. Similar to the mixing valve 10 of FIG. 1, the distance between surface A of the body 112 and surface B of the body cover 120 is greater than the length l of spool 116. The difference in the distance between surface A of body 112 and surface B of body cover 120 and the spool length l is referred to as the spool stroke, which is the distance that the spool 116 can travel between the surface A of body 112 and surface B of body cover 120. Spool 116 includes an annular cold water chamber 134 and is supported and frictionally engaged within body 112 by O-ring seal 136. Spool 116 also includes external hub 200 which extends from the bottom surface 220 of spool 116.

Thermal actuator 114 is an elongated version of the thermal actuator 14, having a longer piston 130 and a longer and narrower cup 132 than the piston 30 and cup 32, respectively of the thermal actuator 14. However, while being shaped differently from thermal actuator 14, thermal actuator 114 operates identically to thermal actuator 14 as described above. As stated above, thermal actuator 114 includes an actuator piston 130, which is biased against head 152 of spindle 140. Thermal actuator 114 is threadably coupled to spool 116 at region 200a within external hub 200 of spool 116, such that actuator piston 130 is centrally disposed within spool 116 and such that the actuator piston 130 travels in a direction along the longitudinal axis 146 of the spool 116.

A mixing chamber 160 is formed between the bottom of spool 116 and an annular ring 162, which is part of cup 132 of thermal actuator 114. The configuration of the external hub 200 enables the thermal actuator 114 to be positioned further downstream from surface A of the body 112, thereby substantially increasing the length of the mixing chamber 160, as compared to the prior art device. This increase in the length of the mixing chamber 160 provides more space for the hot and cold water to mix before the mixture passes over the cup 132 of the thermal actuator 114, thus enabling a more thorough mix of the hot and cold water, as compared to the prior art device.

Figure 4:
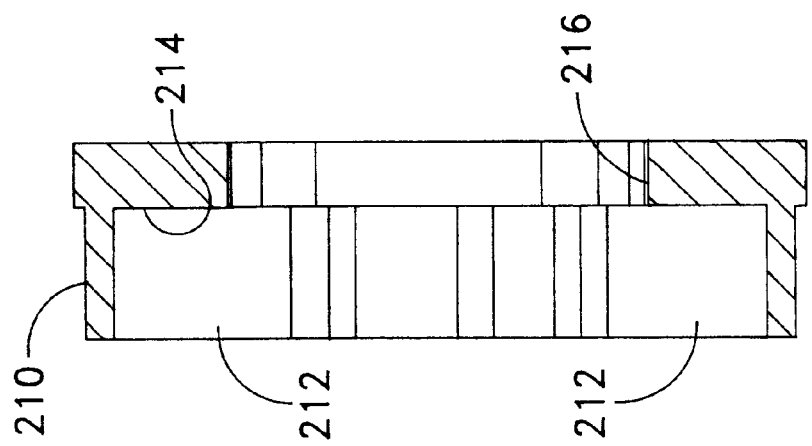
FIG. 4 is a cross-sectional view of the diffuser of FIG. 3, taken along line 4—4 in FIG. 3.
Figure 3:
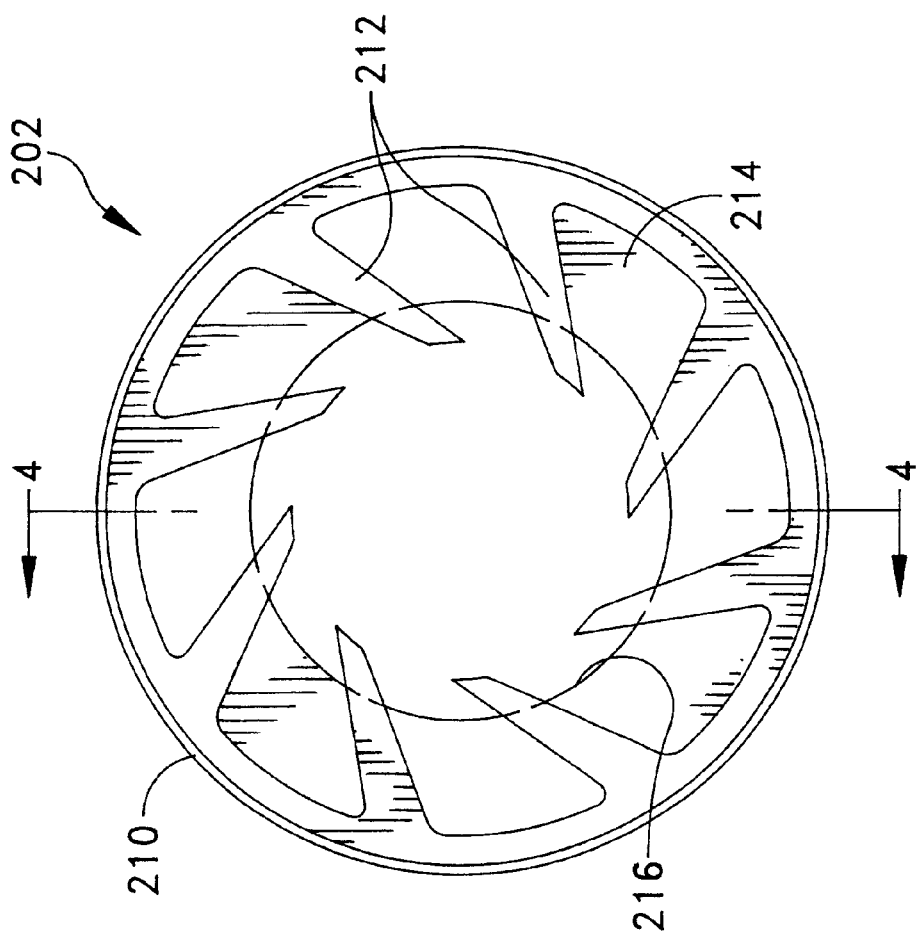
FIG. 3 is a top view of a first embodiment of a diffuser used in conjunction with the mixing valve of the present invention.

A diffuser 202 is biased against annular ring 162 by bias spring 118, which has its other end engaged by a lip 206 of body 112. Diffuser 202 is shown in greater detail in FIG. 3, which is a top view of the diffuser 202 and FIG. 4, which is a cross-sectional view of the diffuser 202, taken along line 4—4 in FIG. 3. As can be seen in FIGS. 2–4, diffuser 202 includes a peripheral wall 210, a number of fins 212 projecting inwardly from the peripheral wall 210 toward the center of the diffuser 202, and an annular plate 214 projecting inwardly from the peripheral wall 210 to form an aperture 216. Aperture 216 has a diameter which is slightly larger that the outside diameter of the cup 132. Preferably, the diffuser is formed from a mixture of polypropelene and fiberglass, however, it will be understood that the diffuser 202 may be formed from any suitable material. Also, diffuser 202 may be formed from a single piece of material, or the peripheral wall 210 and fins 212 may be formed separately from the annular plate 214 and then mounted onto the thermal actuator 114.

Figure 5:
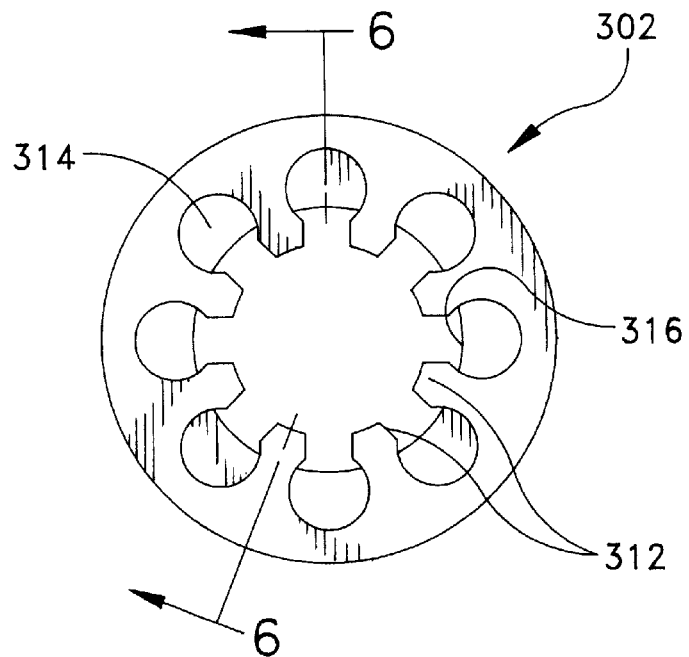
FIG. 5 is a top view of a second embodiment of a diffuser used in conjunction with the mixing valve of the present invention.
Figure 6:
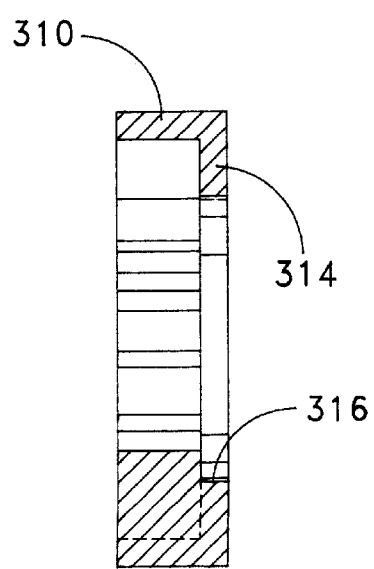
FIG. 6 is a cross-sectional view of the diffuser of FIG. 5, taken along line 6—6 in FIG. 5.

An alternative embodiment of the diffuser is shown at 302 in FIG. 5, which is a top view of the diffuser 302, and FIG. 6, which is a cross-sectional view of the diffuser 302, taken along line 6—6 in FIG. 5. The diffuser 302 includes a peripheral wall 310, a number of fins 312 projecting inwardly from the peripheral wall 310 toward the center of the diffuser 302, and an annular plate 314 projecting inwardly from the peripheral wall 310 to form an aperture 316. Aperture 316 has a diameter which is slightly larger that the outside diameter of the cup 132.

The operation of the mixing valve 100 will now be described. The operation of the temperature selection device 122 is identical to that described with reference to the temperature selection device 22 of FIG. 1, and therefore will not be described with reference to the mixing valve 100.

Hot water enters the body 112 through the external hot port 124a, as shown by dashed lines 180, fills the hot annular distribution groove 156, and then flows radially inward through the internal hot port 124b into the mixing chamber 160. Cold water enters the body 112 through the external cold port 126a, as shown by dotted dashed lines 182, fills the cold annular distribution groove 158, flows radially inward through the internal cold port 126b into the annular cold water chamber 134 and then flows through a series of holes 220 located in the spool 116 into the mixing chamber 160. Due to the increased size of mixing chamber 160, hot and cold water are allowed more volume and time to blend in the mixing chamber 160, thus creating a more thorough and uniform mix. This mixed water then flows through diffuser 202, which preferably imparts rotation to the flow, thereby causing the flow of water to rotate around the cup 132, further agitating and mixing the water. However, it is not essential for the flow to rotate to provide the increased mixing feature of the diffuser 202. For example, while lower water pressures may not result in the rotation of the flow of water, the water passing through the diffuser 202 will still be more thoroughly mixed and agitated than it would in the absence of diffuser 202. Also, the diffuser shown in FIGS. 5 and 6 is less likely to cause the flow of water to rotate than the diffuser shown in FIGS. 3 and 4.

As can be seen in FIG. 2, the diffuser 202 also acts to pull the water toward cup 132 by forcing the water through the aperture 216 in annular plate 214, thus allowing a more accurate sensing of the true average temperature of the mixed water. Furthermore, due to the orientation of bias spring 118, which is inverse from that in the prior art device, the mixed water 184 flows through the diffuser 202 and is discharged from valve 100 through mix port 128 without having to pass through the coils of bias spring 118, thereby eliminating the noise problem associated with the prior art mixing valve.

The operation of the spool 116 and thermal actuator 114 is similar to the operation of the spool 16 and thermal actuator 14 described above. Specifically, if the temperature of the cold water supply decreases such that the thermal expansion material within cup 132 of thermal actuator expands, actuator piston 130 is pushed outwardly from thermal actuator 114 against head 152 of spindle 140. This causes thermal actuator 114 to pull spool 116 away from surface B of body cover 120 and toward surface A of body 112. As spool 116 is pulled toward surface A, the width of the internal hot port 124b decreases, thereby decreasing the amount of hot water which is allowed to pass into mixing chamber 160. At the same time, as spool 116 is pulled away from surface B, the width of the internal cold port 126b increases, thereby increasing the amount of cold water which is allowed to pass through annular cold water chamber 134 and into mixing chamber 160. The resulting mix of water discharged through mix port 128 therefore has a temperature which is closer to the desired temperature set by the temperature selection device. As the temperature of the mixed water decreases, the thermal expansion material contracts, causing actuator piston 130 to recede into the thermal actuator 114. Bias spring 118 then forces thermal actuator 114 and spool 116 toward surface B, thereby allowing internal hot port 124b and internal cold port 126b to return to their steady-state positions.

If the temperature of the hot water supply decreases, the opposite action occurs in thermal actuator 114 and, as piston 130 retracts into the thermal actuator 114, spool 116 is pushed toward surface B by bias spring 118. This causes the width of the internal hot port 124b to increase, thereby increasing the amount of hot water which is allowed to pass into mixing chamber 160. At the same time, as spool 116 is pushed toward surface B, the width of the internal cold port 126b decreases, thereby decreasing the amount of cold water which is allowed to pass through annular cold water chamber 134 and into mixing chamber 160. The resulting mix of water discharged through mix port 128 therefore has a temperature which is closer to the desired temperature set by the temperature selection device.

A characteristic of thermostatic mixing valves is that when water is first drawn, either after a long period of no draws (i.e., overnight) or even shortly after a previous draw, the mix water temperature momentarily overshoots the set temperature. The reason for the overshoot is that as soon as the flow of water ceases, the thermal actuator starts to cool down. However, since the thermal actuator is trying to maintain the set temperature, it is looking for more hot water and less cold water. Accordingly, the width of the hot water port is increased and the width of the cold water port is decreased relative to a steady state condition. When the demand for water is then received, the hot and cold water enters the valve with the spool in a position that allows too much hot water and too little cold water to pass, thus resulting in a mix temperature higher than that which is set by the temperature selection device. This is a momentary condition which begins to correct itself as soon as the mix water contacts the thermal element. Since the thermal element reacts to the increased water temperature by reducing the width of the hot water port while increasing the width of the cold water port, the mix temperature quickly reverts to the desired level.

Figure 1:
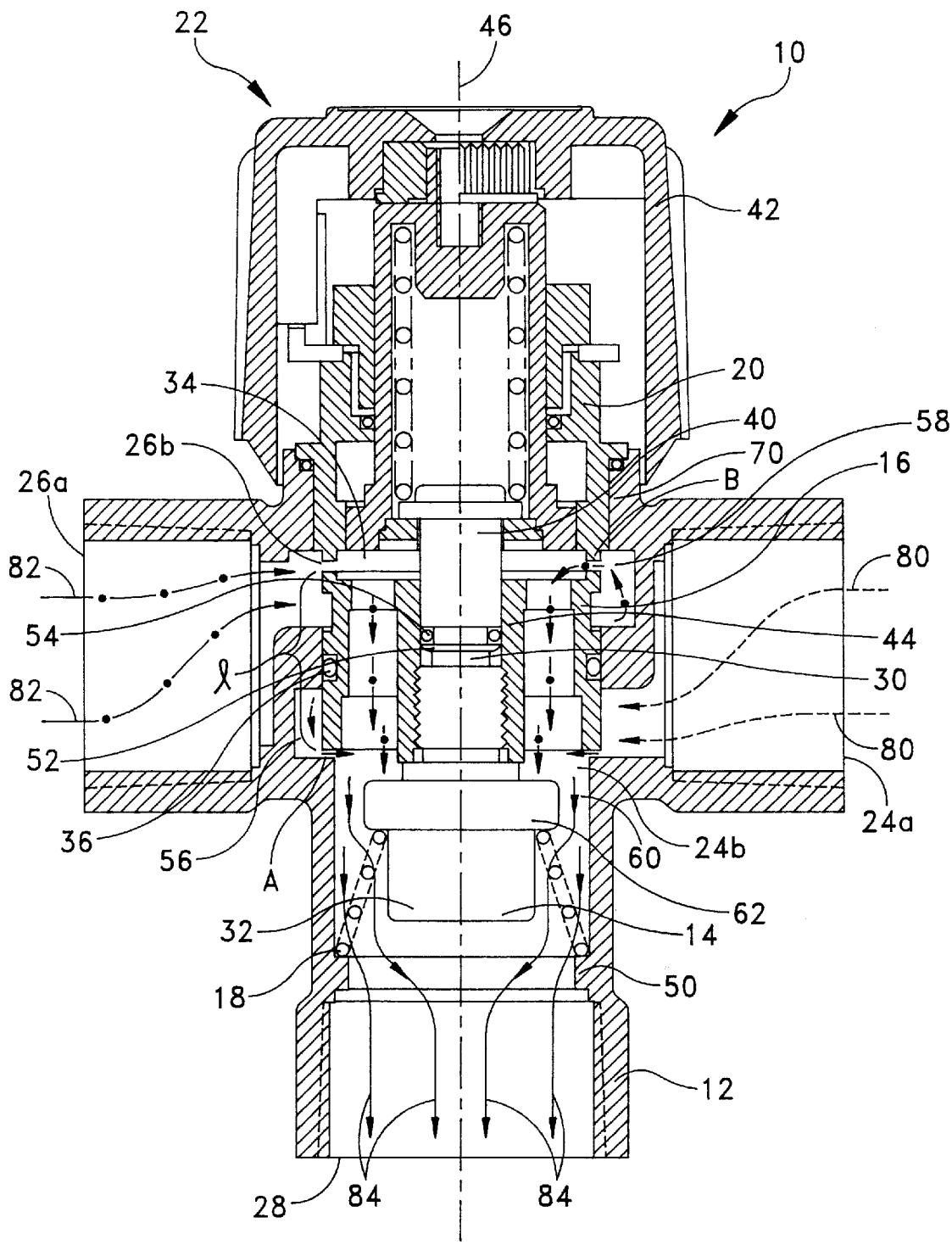
FIG. 1 is a sectional view of a prior art mixing valve.

It has been found that both the magnitude of the temperature overshoot and the duration of the overshoot are significantly decreased with the valve of the present invention as compared to the prior art valve described with reference to FIG. 1. This represents a huge safety advantage. In fact, tests have shown that in the present invention, the magnitude and duration of the temperature overshoot is reduced by approximately 50%.

In summary, it can be seen that the present invention provides a thermostatic mixing valve which facilitates the mixing of the cold and hot water before the water passes over the cup of the thermal actuator, thus allowing the thermal actuator to more accurately react to the temperature of the mixture, thus enabling the thermostatic mixing valve to more accurately maintain the temperature of the water output from the mix port of the mixing valve. Furthermore the mixing valve includes a biasing spring arrangement that prevents the water from being directed away from the thermal actuator and does not vibrate, thus eliminating objectionable noises from the mixing valve during operation.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described.

What is claimed is:

1. A mixing valve which receives fluid from a first source and fluid from a second source and outputs a mixture of the fluids, the mixing valve comprising:
    a valve body comprising:
        a first fluid inlet;
        a first fluid chamber in fluid communication with the first fluid inlet;
        a second fluid inlet;
        a second fluid chamber in fluid communication with the second fluid inlet;
        a mixing chamber in fluid communication with the first fluid chamber and the second fluid chamber; and
        a fluid outlet in fluid communication with the mixing chamber;
    a fluid flow regulator mounted within said housing between said first fluid chamber and said second fluid chamber, wherein a lower surface of said fluid flow regulator is disposed within said first fluid chamber and an upper surface of said fluid flow regulator is disposed within said second fluid chamber, said fluid flow regulator being mounted within said valve body in such a away as to permit movement of said fluid flow regulator along a longitudinal axis of said valve body, said fluid flow regulator having apertures therein which permit a flow of fluid between said second fluid chamber and said mixing chamber, said fluid flow regulator including a central hub which extends below said lower surface into said mixing chamber;
    a temperature-sensing device mounted to said central hub of said fluid flow regulator, said temperature-sensing device including a cup portion disposed proximate said mixing chamber and a piston which extends through said central hub of said fluid flow regulator and into engagement with an adjustably fixed surface of an adjustment device of the mixing valve, the adjustment device being mounted to said valve body of said mixing valve, said cup portion being constructed and arranged for sensing a temperature of fluid which flows from said mixing chamber to said outlet, causing said piston to extend from said temperature-sensing device in response to an increase in temperature and causing said piston to retract into said temperature-sensing device in response to a decrease in temperature; and
    a bias spring mounted between said valve housing and said temperature-sensing device which biases said temperature-sensing device against said adjustably fixed surface of the adjustment device;
    wherein, when the temperature of fluid passing from said mixing chamber over the cup increases, said temperature-sensing device moves said fluid flow regulator downward to limit the flow of fluid from said first fluid chamber to said mixing chamber and increase the flow of fluid from said second fluid chamber to said mixing chamber, and when the temperature of fluid passing from said mixing chamber over the cup decreases, said temperature-sensing device moves said fluid flow regulator upward to limit the flow of fluid from said second fluid chamber to said mixing chamber and increase the flow of fluid from said first fluid chamber to said mixing chamber, thereby causing fluid flowing from said fluid outlet to remain close to a preset temperature which is set by the adjustment device.

2. The mixing valve of claim 1, further comprising a diffuser mounted between said bias spring and an annular ring of said temperature-sensing device, said diffuser being constructed and arranged for agitating said fluid as it passes from said mixing chamber into contact with said cup of said temperature-sensing device.

3. The mixing valve of claim 2, wherein said diffuser includes an annular peripheral wall and an annular plate which extends radially inwardly from said peripheral wall to form an aperture within which said cup of said temperature-sensing device is disposed, wherein fluid flowing from said mixing chamber into said diffuser is agitated and directed toward said cup through said aperture in said annular plate of said diffuser.

4. The mixing valve of claim 3, said diffuser further comprising a number of fins which extend radially inward from said peripheral wall of said diffuser.

5. The mixing valve of claim 3, wherein said bias spring is constructed and arranged to contact said diffuser proximate said peripheral wall, so as to not interfere with fluid as it flows from said diffuser and into contact with said cup of said temperature-sensing device.

6. A mixing valve which receives fluid from a first source and fluid from a second source and outputs a mixture of the fluids, the mixing valve comprising:
    a valve body comprising:
        a first fluid inlet;
        a first fluid chamber in fluid communication with the first fluid inlet;
        a second fluid inlet;
        a second fluid chamber in fluid communication with the second fluid inlet;
        a mixing chamber in fluid communication with the first fluid chamber and the second fluid chamber; and a fluid outlet in fluid communication with the mixing chamber;

a fluid flow regulator mounted within said housing between said first fluid chamber and said second fluid chamber, wherein a lower surface of said fluid flow regulator is disposed within said first fluid chamber and an upper surface of said fluid flow regulator is disposed within said second fluid chamber, said fluid flow regulator being mounted within said valve body in such a away as to permit movement of said fluid flow regulator along a longitudinal axis of said valve body, said fluid flow regulator having apertures therein which permit a flow of fluid between said second fluid chamber and said mixing chamber, said fluid flow regulator including a central hub;

a temperature-sensing device mounted to said central hub of said fluid flow regulator, said temperature-sensing device including a cup portion disposed proximate said mixing chamber and a piston which extends through said central hub of said fluid flow regulator and into engagement with an adjustably fixed surface of an adjustment device of the mixing valve, the adjustment device being mounted to said valve body of said mixing valve, said cup portion being constructed and arranged for sensing a temperature of fluid which flows from said mixing chamber to said outlet, causing said piston to extend from said temperature-sensing device in response to an increase in temperature and causing said piston to retract into said temperature-sensing device in response to a decrease in temperature;

a bias spring mounted between said valve housing and said temperature-sensing device which biases said temperature-sensing device against said adjustably fixed surface of the adjustment device; and a diffuser mounted between said bias spring and an annular ring of said temperature-sensing device, said diffuser being constructed and arranged for agitating said fluid as it passes from said mixing chamber into contact with said cup of said temperature-sensing device;

wherein, when the temperature of fluid passing from said mixing chamber over the cup increases, said temperature-sensing device moves said fluid flow regulator downward to limit the flow of fluid from said first fluid chamber to said mixing chamber and increase the flow of fluid from said second fluid chamber to said mixing chamber, and when the temperature of fluid passing from said mixing chamber over the cup decreases, said temperature-sensing device moves said fluid flow regulator upward to limit the flow of fluid from said second fluid chamber to said mixing chamber and increase the flow of fluid from said first fluid chamber to said mixing chamber, thereby causing fluid flowing from said fluid outlet to remain close to a preset temperature which is set by the adjustment device.

7. The mixing valve of claim 6, wherein said central hub is constructed and arranged to extend below said lower surface into said mixing chamber.

8. The mixing valve of claim 6, wherein said diffuser includes an annular peripheral wall and an annular plate which extends radially inwardly from said peripheral wall to form an aperture within which said cup of said temperature-sensing device is disposed, wherein fluid flowing from said mixing chamber into said diffuser is agitated and directed toward said cup through said aperture in said annular plate of said diffuser.

9. The mixing valve of claim 8, said diffuser further comprising a number of fins which extend radially inward from said peripheral wall of said diffuser.

10. The mixing valve of claim 8, wherein said bias spring is constructed and arranged to contact said diffuser proximate said peripheral wall, so as to not interfere with fluid as it flows from said diffuser and into contact with said cup of said temperature-sensing device.

* * * * *